United States Patent [19]
Murrell

[11] 3,886,968
[45] June 3, 1975

[54] FLOW CONTROL DEVICE

[75] Inventor: Donald K. Murrell, La Mirada, Calif.

[73] Assignee: Robertshaw Controls Company, Richmond, Va.

[22] Filed: Apr. 22, 1974

[21] Appl. No.: 463,015

[52] U.S. Cl. .................................. 137/501; 137/504
[51] Int. Cl. .............................................. G05d 7/01
[58] Field of Search ........... 137/501, 503, 496, 500, 137/504; 251/16, 61, 1

[56] References Cited
UNITED STATES PATENTS

| | | | |
|---|---|---|---|
| 1,838,343 | 12/1931 | Widell | 137/503 |
| 2,219,408 | 10/1940 | Benz et al. | 137/501 X |
| 2,909,191 | 10/1959 | Horton | 137/501 |
| 2,915,084 | 12/1959 | Taylor et al. | 137/501 |
| 2,916,047 | 12/1959 | Butcher | 137/501 |
| 3,023,591 | 3/1962 | Tilney | 137/504 X |
| 3,357,448 | 12/1967 | Martin | 137/501 |
| 3,812,876 | 5/1974 | Krieter | 137/501 |

*Primary Examiner*—Martin P. Schwadron
*Assistant Examiner*—Robert J. Miller
*Attorney, Agent, or Firm*—Anthony A. O'Brien

[57] ABSTRACT

A flow control device includes a casing having a diaphragm therein defining first and second chambers, an inlet communicating with the first chamber and an outlet communicating with the second chamber at a position adjacent a portion of the diaphragm to expose the portion to outlet pressure, a passage providing communication between the first and second chambers and a control valve having a valve member movable in response to movement of the diaphragm such that the area of the diaphragm defining the second chamber is exposed to inlet pressure with the exception of the portion adjacent the outlet and the area of the diaphragm defining the first chamber is exposed to inlet pressure to create a force differential across the diaphragm to move the diaphragm and operate the control valve to provide substantially constant flow with varying inlet pressure and downstream load conditions.

12 Claims, 4 Drawing Figures

FLOW CONTROL DEVICE

BACKGROUND OF THE INVENTION

1. Field of the Invention

The present invention pertains to flow control devices and, more particularly, to a flow control device providing substantially constant flow with varying inlet pressure and downstream load conditions.

2. Discussion of the Prior Art

Fluid flow is conventionally controlled in accordance with the conditions of appliances to which the fluid is to be supplied as well as to assure a substantially constant flow independent of pressure changes in the supply of fluid and changes in load conditions, such as flow resistance due to orifice size, pipe length, bends, turbulence, opening and closing of valves and the like. Prior art flow control devices utilize a diaphragm having a differential pressure across the entire area thereof corresponding to inlet and outlet pressure with movement of the diaphragm controlling a control valve member; however, while such prior art flow control devices have represented an improvement over previously known devices which have had the disadvantages of complex structure, expensive manufacturing and installation costs, such flow control devices can still be desirably simplified and constructed to be more directly responsive to downstream load conditions.

SUMMARY OF THE INVENTION

The present invention is generally summarized in a flow control device including a casing having an inlet and an outlet; a control valve disposed in the casing for controlling flow between the inlet and the outlet; a diaphragm mounted in the casing and movable to operate the control valve, the diaphragm having first and second sides defining first and second chambers, respectively, in the casing, the first chamber communicating with the inlet, the second chamber communicating with the outlet and the second side of the diaphragm having a portion disposed adjacent the outlet to be exposed to outlet pressure; and means for establishing communication between the first and second chambers such that the area of the second side of the diaphragm with the exception of the portion adjacent the outlet is exposed to inlet pressure and the area of the first side of the diaphragm is exposed to inlet pressure whereby a force differential exists across the diaphragm to move the diaphragm to tend to close the control valve when inlet pressure increases or outlet pressure decreases and to tend to open the control valve when inlet pressure decreases or outlet pressure increases.

Accordingly, it is a primary object of the present invention to provide a flow control device utilizing substantially a single pressure operating on a diaphragm to maintain outlet flow substantially constant with varying inlet pressure and varying downstream load conditions.

Another object of the present invention is to utilize pressure acting on differential diaphragm areas to operate a control valve in a flow control device.

A further object of the present invention is to mount a diaphragm in a casing to define first and second chambers both exposed to inlet pressure and to arrange a valve member on the diaphragm at a position to expose the the valve member and, consequently, a portion of the diaphragm to outlet pressure such that the diaphragm is movable to control the position of the valve member relative to a valve seat in response to both inlet and outlet pressure conditions.

The present invention has an additional object in the use of a flow controlling diaphragm positioned to be responsive to both inlet and outlet pressure conditions to operate a control valve.

Some of the advantages of the present invention over the prior art are that the diaphragm is exposed to substantially a single pressure to operate the flow control valve, and the structure of the flow control device is simple in structure thereby reducing manufacturing and maintenance costs.

Other objects and advantages of the present invention will become apparent from the following description of the preferred embodiment taken in conjunction with the accompanying drawings.

DESCRIPTION OF THE PREFERRED EMBODIMENT

Figure 1:
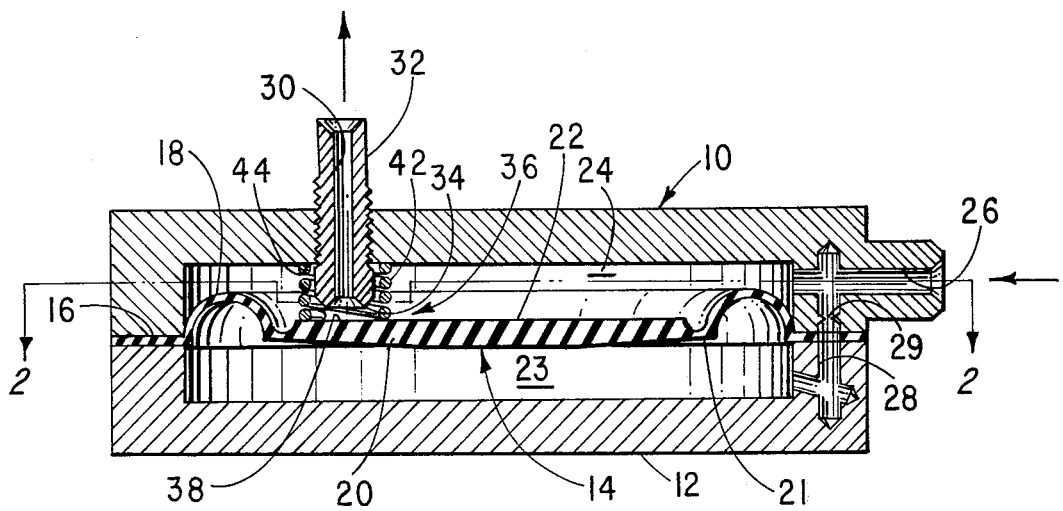
FIG. 1 is a cross section of a flow control device according to the present invention.
Figure 2:
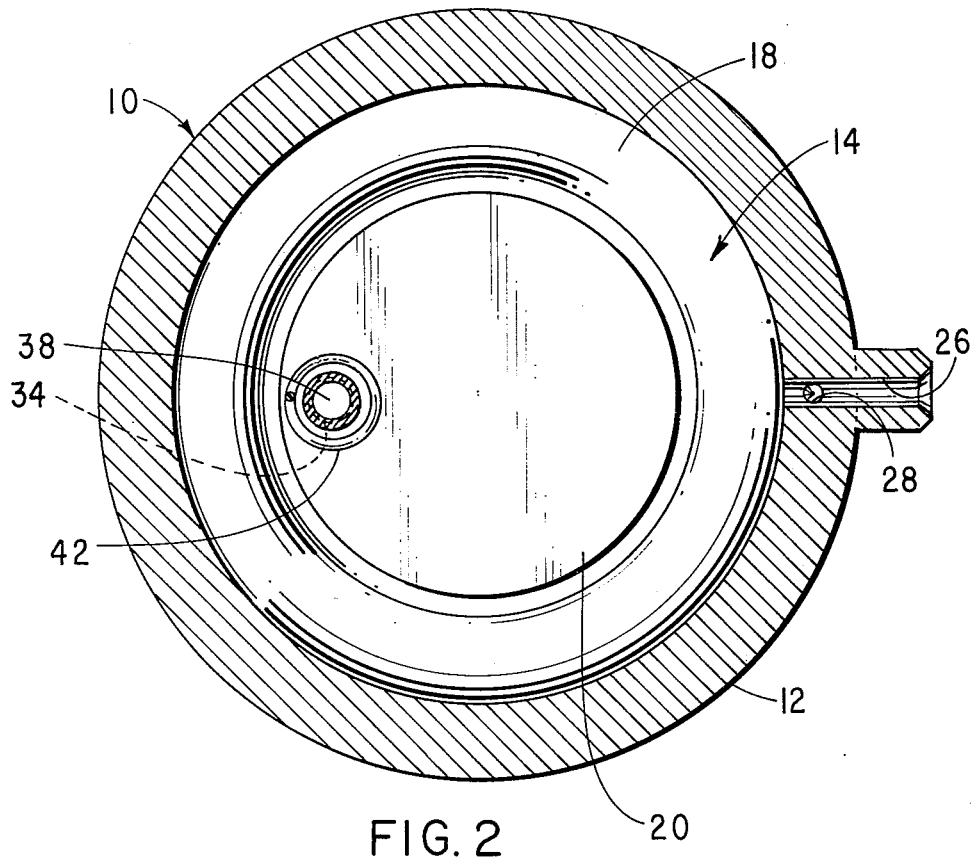
FIG. 2 is a section taken along line 2—2 of the flow control device of FIG. 1.

A flow control device 10 according to the present invention, as illustrated in FIGS. 1 and 2, includes a circular casing 12 having a flexible flow controlling diaphragm 14 mounted therein with a marginal edge 16 sealed between halves of the casing 12 in fluid-tight relation. The diaphragm 14 has an annular flexing rib 18 joining the marginal edge 16 with a thickened central portion 20, and the diaphragm has opposite sides 21 and 22 defining chambers 23 and 24, respectively, in the casing. The casing 12 has an inlet 26 communicating with chamber 24 and chamber 23 communicates with inlet 26 and chamber 24 through a passage 28 having a restriction 29 therein. An outlet passage 30 is formed in a fitting 32 threadedly engaging the top wall of the casing 12 at a position spaced from the center thereof, the internal end of the fitting 32 extending within chamber 24 to form a valve seat 34 of a control valve 36 having a valve member formed by a portion 38 of the central portion 20 of diaphragm 14. The surface of the valve member 38 is disposed adjacent the outlet passage 30 so as to be exposed to pressure downstream of the flow control device 10. A coiled spring 42 is mounted in compression between the diaphragm 14 and the casing 12 at a position adjacent the control valve 36 surrounding fitting 32.

In operation, a force differential will exist across the diaphragm 14 in that the side 21 of the diaphragm will be exposed to inlet pressure over its entire area in chamber 23 while the side 22 of the diaphragm will be exposed to inlet pressure in chamber 24 over its entire area with the exception of the area of the valve member portion 38 adjacent the outlet 30. Since the valve member portion 38 is exposed to the pressure at outlet 30 and rapid laminar fluid flow over surface portions adjacent the valve seat 34 and since outlet pressure is less than inlet pressure and rapid laminar fluid flow produces reduced pressure transverse to the flow, the total force pushing down on the side 22 of diaphragm 14 will be less than the total force pushing up on the side 21 of the diaphragm. Thus, the diaphragm will tend to move valve member 38 toward valve seat 34 to restrict flow through the control valve 36 until the force differential across the diaphragm is balanced against the force from the spring 42.

When the load downstream of the flow control device 10 is constant, such load including flow resistance due to orifice size, length of conduits, bends, turbulence, opening and closing of valves, and the like, the force exerted on the side 22 of the diaphragm via valve member 38 will be constant, and the force differential across the diaphragm will be directly proportional to inlet pressure. Accordingly, if inlet pressure increases, the force differential tending to close the control valve 36 increases and balances the diaphragm with the valve member 38 at a position closer to the valve seat 34 thereby restricting flow and tending to maintain the desired flow rate set by adjustment of fitting 32 to control the positioning of the valve seat 34. Conversely, if inlet pressure decreases, the force differential across the diaphragm will decrease and balance the diaphragm with the valve member 38 spaced further away from the valve seat 34 in order to maintain the desired flow rate. The restricting orifice 29 prevents the flow control device 10 from slamming closed in response to a surge of high pressure and staying closed with continued high pressure.

When inlet pressure is constant, the force differential across the diaphragm will be inversely proportional to the outlet pressure acting on the area of the diaphragm forming the valve member 38; and, accordingly, if the load downstream of the flow control device 10 decreases, outlet pressure will decrease to increase the force differential across the diaphragm thereby moving the valve member 38 closer to the valve seat 34 to restrict flow and maintain the desired flow rate. Conversely, if the load downstream of the flow control device increases, the outlet pressure will increase to decrease the force differential across the diaphragm to balance the diaphragm with the valve member 38 at a position further away from the valve seat 34 to maintain the desired flow rate.

In similar fashion, the flow control device 10 is operative in response to varying inlet (or upstream) pressure and outlet (or downstream) load conditions simultaneously to maintain flow controlled by control valve 36 substantially constant.

The flow rate can be adjusted by rotating fitting 32 such that the position of the valve seat is varied without changing the spring force. In this manner, when the valve seat is moved toward the diaphragm, the flow rate will be materially decreased; and, conversely, movement of the valve seat away from the diaphragm will materially increase the flow rate. The flow rate could also be adjusted, as an alternative, by varying the spring force without changing the position of the valve seat.

Figure 3:
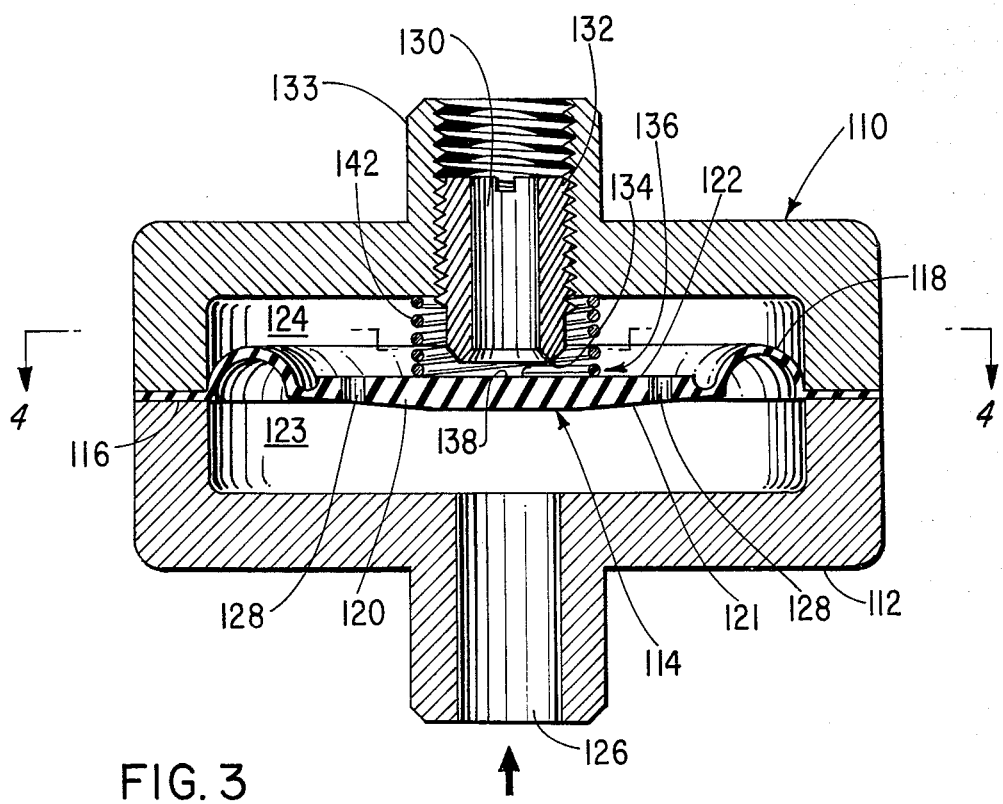
FIG. 3 is a cross section of another embodiment of a flow control device according to the present invention.
Figure 4:
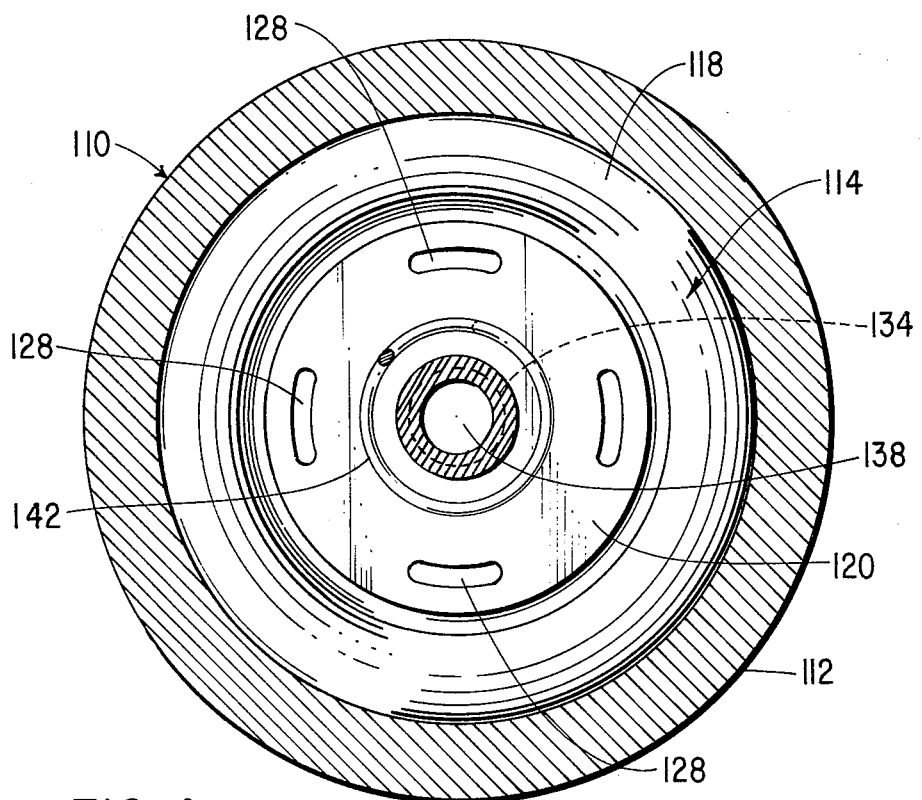
FIG. 4 is a section taken along line 4—4 of the flow control device of FIG. 3.

Another embodiment of a flow control device 110 according to the present invention is illustrated in FIGS. 3 and 4 and parts of the flow control device 110 similar to parts of the flow control device 10 of FIGS. 1 and 2 are given the same reference numbers with 100 added. The flow control device 110 differs from the flow control device 10 primarily in that the inlet and outlet are disposed in an in-line arrangement with communication between the chambers established through the diaphragm.

Flow control device 110 includes a circular casing 112 having a flexible flow controlling diaphragm 114 mounted therein with a marginal edge 116 sealed between halves of the casing in fluid-tight relation. The diaphragm 114 has an annular flexing rib 118 joining the marginal edge 116 with a thickened central portion 120, and the diaphragm has opposite sides 121 and 122 defining chambers 123 and 124, respectively, in the casing. Casing 112 has an inlet 126 centrally disposed in a bottom wall thereof in communication with chamber 123, and communication is established between chambers 123 and 124 through relatively large arcuate ports 128 formed in the central portion 120 of diaphragm 114. An outlet passage 130 is formed in a fitting 132 threadedly engaging a nipple 133 extending centrally from a top wall of the casing such that the outlet 130 communicates with chamber 124, the inlet 126 and the outlet 130 being arranged in coaxial alignment. The internal end of fitting 132 forms a valve seat 134 of a control valve 136 having a valve member formed by a portion 138 of the central portion of the diaphragm 114 such that the surface of the valve member 138 is disposed adjacent the outlet 130 to be exposed to pressure downstream of the flow control device 110. A coiled spring 142 is mounted in compression between the top wall of casing 112 and the diaphragm 114 adjacent control valve 136 and surrounding the fitting 132.

The operation of flow control device 110 is substantially the same as that of flow control device 10 with the exception that flow between the inlet 126 and the outlet 130 of the casing passes through the ports 128 in diaphragm 114. That is, the side 121 of the diaphragm 114 is exposed to inlet pressure over its entire area in chamber 123 while the side 122 of the diaphragm 114 is exposed to inlet pressure over its entire area with the exception of the area of the valve member portion 138 adjacent the outlet 130. Accordingly, since outlet pressure is less than inlet pressure, the total force pushing up on the side 121 of the diaphragm is greater than the total force pushing down on the side 122 of the diaphragm, and the diaphragm will move valve member portion 138 toward valve seat 134 to restrict flow through the control valve 136 until the force differential across the diaphragm 114 is balanced against the force from the spring 142. When the load downstream of the flow control device 110 increases, outlet pressure will accordingly increase to move the valve member 138 away from valve seat 134 and increase flow; and, conversely, when the downstream load decreases, the outlet pressure will decrease such that the valve member portion 138 will move closer to the valve seat 134 to restrict flow and maintain the desired flow rate. Similarly, when inlet pressure increases, the valve member 138 will move closer to the valve seat 134 to restrict flow and maintain the desired flow rate while a decrease in inlet pressure will cause the valve member 138 to move away from the valve seat 134 to increase flow to provide the desired flow rate.

While the construction of the flow control devices shown in the drawings and described above is preferred due to the advantages of associating the control valve with the outlet, the control valve can be disposed at any suitable position so as to be operated by movement of the diaphragm to control flow, and the diaphragm and casing can have any desired configuration, it being basic to the present invention primarily only that the diaphragm be exposed to substantially only a single pressure, i.e., inlet pressure, with the exception of the small portion exposed to outlet pressure. While the valve member of the control valve preferably is formed by a portion of the diaphragm, the valve member can have any suitable structure, such as with the valve member integrally formed as a member projecting from the surface of the diaphragm or the valve member being a separate member operated and/or carried by the diaphragm, it not being necessary that the control valve have an "off" or closed position.

Inasmuch as the present invention is subject to many variations, modifications and changes in detail, it is intended that all matter described above or shown in the accompanying drawings be interpreted as illustrative and not in a limiting sense.

What is claimed is:

1. A flow control device comprising
a casing having inlet means and outlet means;
control valve means disposed in said casing for controlling flow between said inlet means and said outlet means;
diaphragm means including a flexible outer portion and a thickened central portion mounted in said casing, the flexible outer and thickened central portions being movable to operate said control valve means, said diaphragm means having first and second sides on the flexible outer and thickened central portions defining first and second chambers, respectively, in said casing, said outlet means being disposed in said casing in off centered relation to said thickened central portion, said first chamber communicating with said inlet means, said second chamber communicating with said outlet means, and said thickened central portion on said second side of said diaphragm means having an off centered portion disposed adjacent said flexible outer portion and said outlet means to be exposed to outlet pressure;
said control valve means including a valve member carried on said off centered portion adjacent said outlet means;
and
means for establishing communication between said first and second chambers such that the area of said second side of said diaphragm means with the exception of said off centered portion adjacent said outlet means is exposed to inlet pressure and the area of said first side of said diaphragm means in exposed to inlet pressure whereby a force differential exists across said diaphragm means to move said diaphragm means to tend to close said control valve means when inlet pressure increases or outlet pressure decreases and to tend to open said control valve means when inlet pressure decreases or outlet pressure increases.

2. A flow control device as recited in claim 1 wherein said control valve means includes a valve seat defined by said outlet means, said valve member being aligned with said valve seat to be exposed to outlet pressure.

3. A flow control device as recited in claim 2 wherein said outlet means includes a fitting carried by said casing having an internal end forming said valve seat.

4. A flow control device as recited in claim 1 wherein said valve member is integrally formed with said off centered portion.

5. A flow control device as recited in claim 3 wherein said fitting threadedly engages said casing and further comprising spring means mounted adjacent said control valve means in compression between said casing and said thickened central portion whereby adjustment of said fitting moves said valve seat relative to said valve member to adjust flow controlled by said control valve means without changing said spring means.

6. A flow control device as recited in claim 1 and further comprising means biasing said control valve means open.

7. A flow control device as recited in claim 6 wherein said biasing means includes spring means engaging said thickened central portion.

8. A flow control device as recited in claim 1 wherein said control valve means is disposed at said outlet means to be exposed to outlet pressure, and said off centered portion on said second side of said thickened central portion adjacent said outlet means operates said control valve means.

9. A flow control device as recited in claim 8 wherein said control valve means includes a valve member operated by said off centered portion on said second side of said thickened central portion adjacent said outlet means.

10. A flow control device as recited in claim 9 wherein said off centered portion on said second side of said thickened central portion adjacent said outlet means forms said valve member.

11. A flow control device as recited in claim 1 wherein said means for establishing communication between said first and second chambers includes passage means formed in said casing.

12. A flow control device as recited in claim 11 wherein said passage means has a first passage communicating with said inlet means and said first chamber, a second passage communicating with said inlet means and said second chamber and restriction means disposed in said first passage.

* * * * *